United States Patent
Inoue et al.

[11] 3,729,228
[45] Apr. 24, 1973

[54] VEHICLE SEAT PROVIDED WITH A HEAD REST

[75] Inventors: Masahiko Inoue, Takashi Saito, both of Toyota, Japan

[73] Assignee: Toyota Jidosha Kogyo Kabushiki Kaisha, Toyota, Japan

[22] Filed: Ap. 1, 1971

[21] Appl. No.: 130,214

[30] Foreign Application Priority Data

Apr. 10, 1970 Japan..............................45/30592

[52] U.S. Cl. ................................................297/396
[51] Int. Cl. ..............................................A47b 11/00
[58] Field of Search....................291/216, 397, 396, 291/398, 399, 452

[56] References Cited

UNITED STATES PATENTS

| | | | |
|---|---|---|---|
| 3,264,382 | 8/1966 | Angell et al. | 297/396 |
| 3,537,751 | 11/1970 | Inoue et al. | 297/452 |
| 3,515,434 | 6/1970 | Sugiura et al. | 297/396 |
| 3,498,672 | 3/1970 | Leichtl | 297/397 |
| 3,429,615 | 2/1969 | Belk | 297/397 |

Primary Examiner—Bernard A. Gelak
Assistant Examiner—Garry Moore
Attorney—Toren & McGeady

[57] ABSTRACT

A seat having a head rest wherein the head rest is formed integrally with a back of the seat. Said seat comprises a reinforcement for the head rest provided on the top of a back frame, a shock absorber for the head rest formed as a unit in the shape of a bag for covering said reinforcement for the head rest and an upper portion of said back frame, and means for firmly securing said shock absorber for the head rest to the back.

1 Claim, 6 Drawing Figures

Patented April 24, 1973 3,729,228

INVENTORS
MASAHIKO INOUE
BY TAKASHI SAITO
Toren and McGaddy
ATTORNEYS

INVENTORS
MASAHIKO INOUE
TAKASHI SAITO
BY Toren and McGeady
ATTORNEYS

VEHICLE SEAT PROVIDED WITH A HEAD REST

This invention relates to seats each provided with a head rest for use with motor vehicles, ships, railway coaches, aircraft and the like.

There have been proposed a variety of constructions for seats of motor vehicles, aircraft and the like each of which comprises a head rest mounted at the upper end of the back of the seat. Conventional constructions for the seat provided with a head rest are all such that the head rest made separately from and independently of the seat proper is inserted in the back of the seat and firmly secured in place by means of a stay or fitted over the upper end of the back of the seat. Head rests of the prior art described above have disadvantages in that they may fail to function properly when the head rests are not disposed in a correct position or they are not mounted in proper manner. In addition, since such head rests are not provided, at the back or opposite sides of the head rests, with means for protecting the passenger against injury, there is the danger of a passenger on the rear seat being seriously damaged when he is violently thrown against the back of the head rest of the seat in front of him.

A principal object of this invention is to provide a seat having a head rest which positively ensures the safety of a passenger, which is capable of absorbing a large amount of energy of impact, and which is low in cost because it can be manufactured readily.

Another object of the invention is to provide a seat having a head rest adapted to obviate the aforementioned disadvantages in which reinforcement for the head rest and a back frame for the seat are connected together as a unit, and a shock absorber for the head rest is of such shape that it can provide cover to the entire outer surface of the reinforcement for the head rest and the top of the back frame of the seat, so that the shock absorber for the head rest can be secured in place together with a shock absorber for the back of the seat by being fitted over the reinforcement for the head rest and the back frame of the seat.

A further object of the invention is to provide a seat having a head rest in which the reinforce member for the head rest is made of an impact energy absorbing material having an inner space and formed with openings or other readily deformable portions so that the head rest may have an increased ability to absorb the energy of impact.

Additional objects as well as features and advantages of this invention will become evident from the description set forth hereinafter when considered in conjunction with the accompanying drawings, in which.

Figure 1:
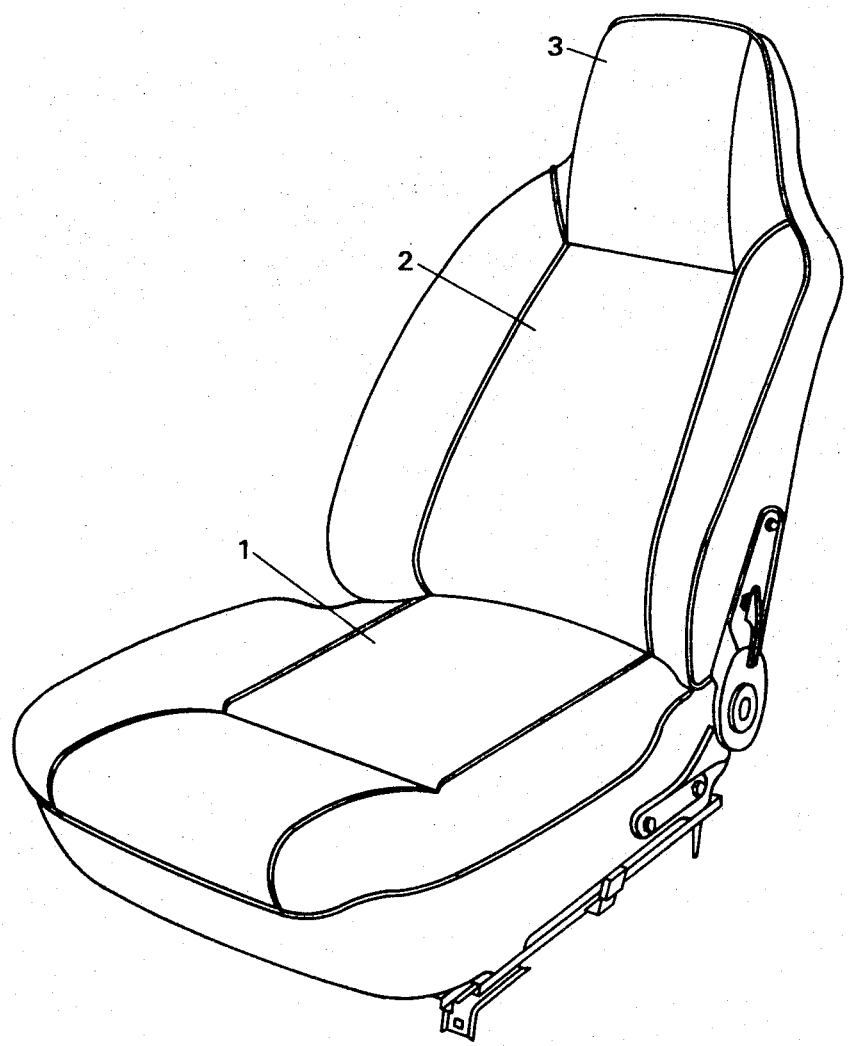
FIG. 1 is a perspective view of the seat according to this invention.
Figure 2:
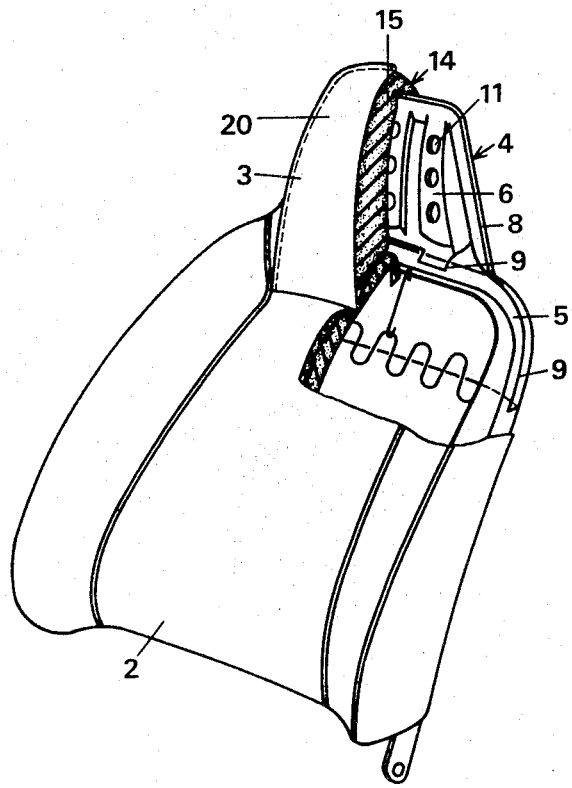
FIG. 2 is a perspective view of essential portions of the seat of FIG. 1, with certain parts being cut out.
Figure 3:
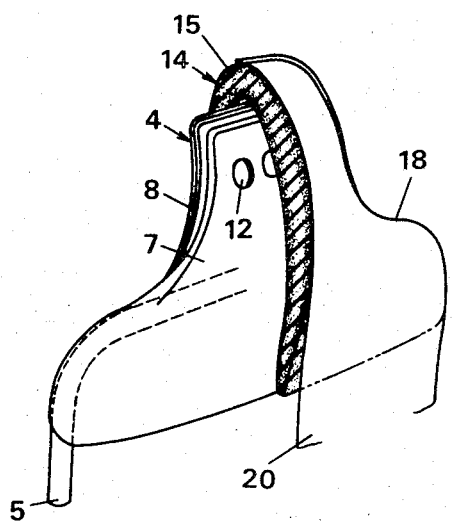
FIG. 3 is a rear view of the seat.

The embodiment of this invention shown in FIG. 1 comprises a seat 1, a back 2 and a head rest 3 disposed at the top of the back 2 and formed integrally therewith. The back 2 and head rest 3 have a reinforcement 4 for the head rest 3 and a conventional back frame 5 which are connected together as a unit as shown in FIGS. 2 and 3. The reinforcement 4 for the head rest 3 comprises a front plate 6 and a rear plate 7 which are arranged in face-to-face relationship to be connected together by welding at a marginal portion 8 and connected by welding to the back frame 5 at lower marginal portions 9.

Figure 4:
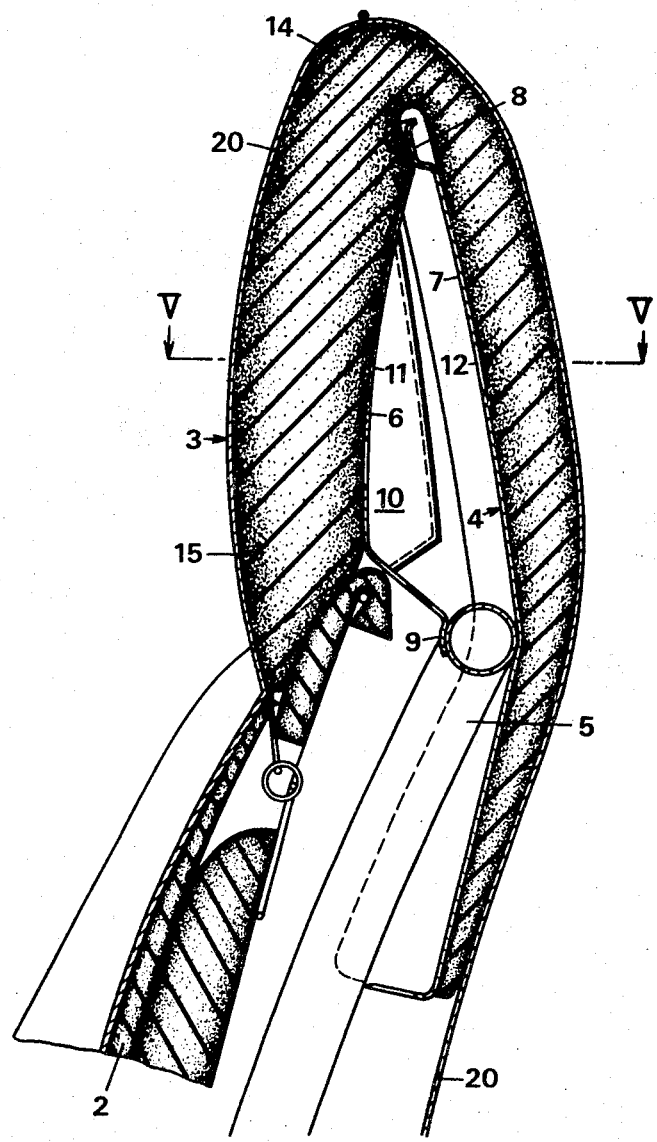
FIG. 4 is a central sectional view of the upper portion of the seat of FIG. 1.
Figure 5:
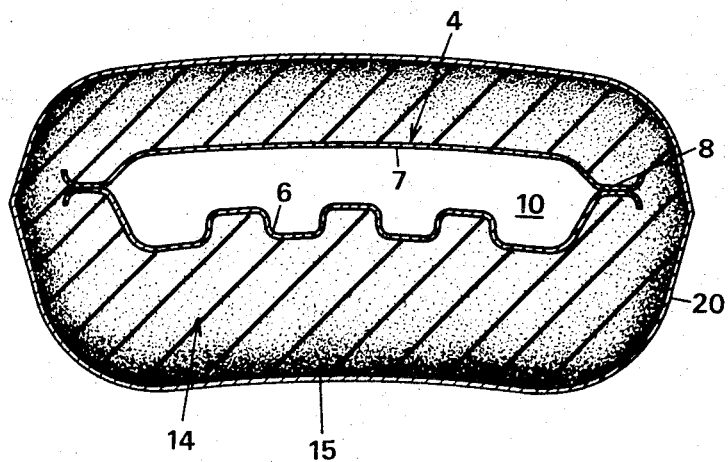
FIG. 5 is a sectional view taken along the line V—V of FIG. 4.

As shown in FIG. 4, an inner space 10 is formed between the front and rear plates 6 and 7 which are formed with readily deformable portions or openings 11 and 12 respectively. The front plate 6 may be formed with irregularities as shown in section in FIG. 5. The provision of the irregularities as shown is conducive to ready plastic deformation of the head rest when the head of the passenger on the seat is pressed against the head rest at the time of collision.

A shock absorber 14 for the head rest 3 formed with a foamed polyester or other material is provided on the reinforcement 4 for the head rest 3 and the top of the frame 5 of the back 2 to provide cover to the entire surface thereof.

Figure 6:
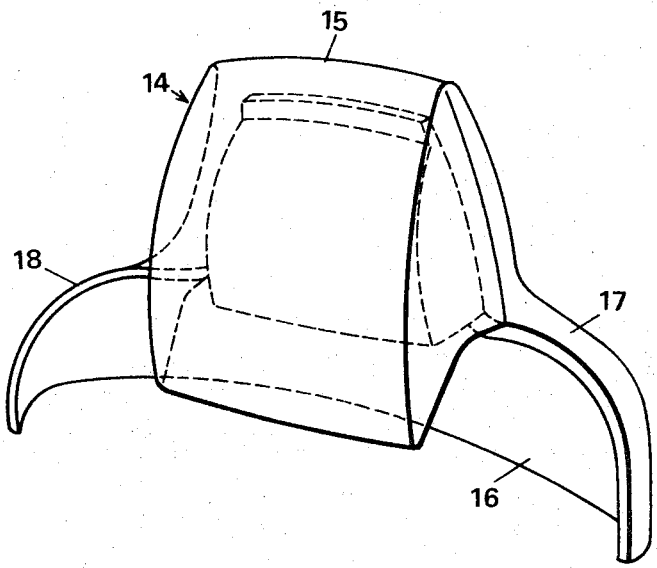
FIG. 6 is a perspective view of the shock absorber for a head rest.

As shown in FIGS. 3 and 6, the shock absorber 14 comprises a bag-shaped portion 15 enclosing the reinforcement 4, a rear portion 16 covering an upper portion of a rear surface of the back 2, and shoulder portions 17 and 18 covering two shoulders of the back 2 which are formed integrally as a unit. The shock absorber 14 is firmly secured to the reinforcement 4 and back frame 5 by suitable means, such as adhesive bonding or clamping, and covered, in turn, with an outer covering 20. The shock absorber 14 may be placed on the top of the back 2, without being fixed thereto, and firmly secured in place by the outer covering 20.

The present invention is characterized by the aforementioned construction of the seat. The invention offers an advantage in that, when a collision occurs between a motor vehicle provided with the seats according to this invention and a motor vehicle following the first-mentioned motor vehicle, the shock absorber 14 primarily absorbs the energy of impact with which the head of a passenger is thrusted against the head rest as it tends to be rapidly inclined rearwardly, and the reinforcement 4 for the head rest 3 provided with the inner space 10 and openings 11 and 12 secondarily absorbs the energy of impact by plastic deformation because the stresses are concentrated in the openings 11 and 12. Stated differently, the reinforcement 4 undergoes deformation before the passenger is injured, thereby reducing the impact of collision exerted on the head of the passenger.

The seat according to this invention offers an advantage in case of a head-on collision, too. More specifically, when a passenger on a rear seat is thrown against the rear surface of a front seat by the impact of collision, a rear surface of the bag-shaped portion 15, the rear portion 16 and the reinforcement 4 operate in the same manner as described above. Besides, the provision of rear surface 16 and the shoulders 17 and 18 is effective to prevent injuries which the passenger on the rear seat might otherwise suffer from the ends of a metal members or the like.

The various components of the shock absorber 14 and reinforcement 4 operate positively under any circumstances, because the head rest 3 is formed integrally with the seat 1 and firmly secured in a proper position when the seat 1 is manufactured.

As described in some detail hereinabove, the shock absorber completely covers the entire surface of the reinforcement for the head rest and the back frame which are connected together as a unit according to this invention. This feature offers many advantages. The present invention ensures that both the passenger on the seat and the passenger sitting on a seat disposed rearwardly thereof are positively protected from injufires. Since the head rest according to this invention can be arranged in an optimum position when the seat is manufactured, the head rest of the seat according to this invention can function properly in providing safety to the passenger sitting thereon. The shock absorber is substantially in the shape of a bag in its entirely and formed integrally as a unit. This facilitates not only manufacture but also mounting and attaching of the shock absorber to the reinforcement and the back frame. In addition, the construction of the absorber according to this invention permits to economize on the material of the shock absorber.

In another aspect of the present invention, absorption of the energy of impact can be achieved by plastic deformation of the reinforcement for the head rest, too. Plastic deformation of the reinforcement is such that it can absorb a considerably large amount of energy of impact without injuring the neck of the passenger. Besides, it is possible to economize on the material of the shock absorber by virtue of the presence of the internal space and increased shock absorbing efficiency achieved by the present invention.

What is claimed is:

1. In a vehicle seat and head rest construction, the combination comprising:

an upstanding back member for said seat;

a reinforcement member for said head rest, said reinforcement member including a pair of rigid plates joined together at their peripheral edges in spaced apart relationship to define an internal empty space therebetween, said plates including openings therethrough and being formed with corrugations therein to facilitate plastic deformation of said reinforcement member;

means rigidly mounting said reinforcement member to said upstanding back member to form said members into a combined unitary rigid structure; and a shock absorber unit composed of pliable material and formed as a separate unitary member in the shape of a bag configured to generally correspond to the shapes of said reinforcement member and portions of said upstanding back member adjacent thereto, said shock absorber means being attached in a position to cover said reinforcement member and said portions of said back member; whereby upon impact of an object with said seat and head rest construction, the energy of impact will be absorbed by said shock absorber means with excess impact energy being transmitted to said reinforcement member which may operate to absorb said excess energy by plastic deformation thereof facilitated by said openings and corrugations as well as by the empty internal space defined between said rigid plates.

* * * * *